United States Patent
Martelock et al.

(10) Patent No.: US 11,914,983 B2
(45) Date of Patent: Feb. 27, 2024

(54) VIRTUAL RESTRUCTURING FOR PATCHING COMPRESSED DISK IMAGES

(71) Applicant: Apple Inc., Cupertino, CA (US)

(72) Inventors: Christian T. Martelock, Los Gatos, CA (US); Ali Sazegari, Los Altos, CA (US); Eric Bainville, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 8 days.

(21) Appl. No.: 17/898,013

(22) Filed: Aug. 29, 2022

(65) Prior Publication Data
US 2023/0393830 A1 Dec. 7, 2023

Related U.S. Application Data
(60) Provisional application No. 63/349,032, filed on Jun. 3, 2022.

(51) Int. Cl.
*G06F 8/61* (2018.01)
*G06F 8/658* (2018.01)
*G06F 9/445* (2018.01)

(52) U.S. Cl.
CPC ............ *G06F 8/63* (2013.01); *G06F 8/658* (2018.02); *G06F 9/44505* (2013.01)

(58) Field of Classification Search
None
See application file for complete search history.

(56) References Cited

U.S. PATENT DOCUMENTS

| | | | | |
|---|---|---|---|---|
| 9,792,109 | B2 * | 10/2017 | Bainville | G06F 8/658 |
| 2011/0314070 | A1 * | 12/2011 | Brown | G06F 16/16 707/827 |
| 2019/0147165 | A1 * | 5/2019 | Chen | H04L 9/0643 726/22 |
| 2021/0004251 | A1 * | 1/2021 | Skourtis | G06F 9/44578 |

* cited by examiner

*Primary Examiner* — Marina Lee
(74) *Attorney, Agent, or Firm* — Kilpatrick Townsend & Stockton LLP

(57) ABSTRACT

Aspects and features include using a virtual disk image to improve computational performance when applying a software patch. Compressed extents within a stored disk image are detected. The compressed extents are virtually reordered to form compressed forks within a virtual disk image and the compressed forks are selected for decompression based on code to be patched. A decompressed fork with the patch is virtually written to the same or another virtual disk image as an updated fork, and the virtual disk image is used to write to storage, either to overwrite the same stored disk image or to produce an updated, compressed disk image. In some examples, the virtual disk image is validated prior to writing to the compressed image by comparing an output hash from the compressed disk image with a known hash to validate the virtual disk image.

20 Claims, 8 Drawing Sheets

VIRTUAL RESTRUCTURING FOR PATCHING COMPRESSED DISK IMAGES

CROSS-REFERENCE TO RELATED APPLICATION

This application claims the benefit of U.S. Provisional Application No. 63/349,032 filed Jun. 3, 2022, entitled "Virtual Restructuring for Patching Compressed Disk Images." The disclosure of this application is incorporated by reference herein in its entirety.

BACKGROUND

A disk image is a file that stores all of the content of an entire disk. The term "disk" in this context refers to a volume of related information, such as may be, or may have traditionally been, stored on an individual optical disk, hard disk, or the like. Examples of such a volume of related information include an application and its accompanying libraries, and an entire operating system for a computing device. A disk image, despite the term "disk" in its name, can be retained in any type of storage, including the flash drives commonly used in mobile computing devices and increasingly used in notebook and desktop computers.

One example of processing that can be applied to disk image files is patching, wherein portions of the code in a disk image file are replaced with updated or new code to provide new features, bug fixes, or security updates to an operating system or an application. Some disk image files can be difficult to process efficiently due to their large size, and the use of file system compression algorithms inside the image to accommodate that size. Decompression and recompression can be demanding of processing resources. A large file size proportionally increases this demand. It is desirable to provide a mechanism to improve the computational performance of applying a patch to the content of a disk image.

BRIEF SUMMARY

Aspects and features of this disclosure include virtual restructuring of a compressed disk image in order to improve computational performance for applying a patch to the contents of the disk image. In one example, compressed extents within a stored disk image can be detected in response to a request to apply a patch to the stored disk image. The compressed extents can be virtually reordered to form compressed forks within a virtual disk image and at least one compressed fork is selected for decompression based on the request to apply the patch. A decompressed fork with the patch is virtually written to the same or another virtual disk image, as an updated fork, and the virtual disk image is used to write to storage to produce an updated, compressed disk image.

As an example embodiment, a method includes accessing a stored disk image in response to a request to apply a patch to the stored disk image, and detecting compressed extents within the stored disk image. The method further includes reordering the compressed extents to form one or more compressed forks within a virtual disk image. The method also includes virtually decompressing at least one fork from the one or more compressed forks within the virtual disk image based on the request to apply the patch, and virtually writing a fork with the patch as an updated fork. The updated fork is compressed and written, as compressed, to storage to produce an updated, stored disk image.

Another aspect of the present disclosure includes a system comprising one or more processors and a communicatively coupled memory that includes instructions that when executed by the one or more processors, cause the one or more processors to perform one or more methods as described above.

Other aspects of the present disclosure include a non-transitory computer-readable medium, that stores instructions that, when executed by one or more processors, cause the one or more processors to perform one or more methods described above.

A better understanding of the nature and advantages of embodiments of the present disclosure may be gained with reference to the following detailed description and the accompanying drawings.

DETAILED DESCRIPTION

Some disk image files can be difficult to process efficiently due to their size and due to the use of compression algorithms applied to a disk image to reduce its size for more efficient storage of the disk image. In some file systems, file data is stored in forks, each corresponding to a file or code segment. Forks may be broken up into smaller pieces ("extents") by the compression process to maximize the use of smaller blocks of free storage space and thus provide for storing the disk image as space-efficiently as possible.

A patch may be applied to a disk image using a patch file supplied to a target computing device on which the patch is to be installed. When the patch is applied by the target computing device to a compressed disk image, the code that is to be patched is read from the disk image and then replaced. Decompression in order to apply the patch in memory and subsequent recompression of the patched code for storage may thus include reassembling forks and can be demanding of processing resources, even more so, if the recompression cannot guarantee a bit-identical compressed bitstream being written back to the storage device, which should be assumed. A large file size proportionally increases this demand.

Methods and systems are disclosed herein for using a virtual disk image to improve computational performance for applying a software patch. In one example, compressed extents within a stored disk image are detected in response to a request to apply a patch to the stored disk image. The compressed extents are virtually reordered to form compressed forks within a virtual disk image and compressed forks are selected for decompression based on the request to apply the patch. A decompressed fork with the patch is virtually written to the same or another virtual disk image, as uncompressed data (an updated fork), and the virtual disk image is used to write back to the same or another stored, compressed disk image. In some examples, the virtual disk image is validated prior to writing to the compressed disk image by comparing an output hash from the compressed disk image with a known hash to validate the virtual disk image with the updated fork. The known hash can be provided by a server that distributes the patch. This validation ensures that the image that is about to be patched has not been tampered with.

In some examples the output hash is a cryptographic hash from a two-layer hash configured by the server to identify differences between an input file and an output file used to produce the patch. The output hash corresponds to a relatively small portion of the virtual disk image. The two-layer hash in such examples also includes a non-cryptographic hash (e.g., a cycle redundancy check or a rolling polynomial) that can be used to identify matching portions in the input and output image.

I. System for Differential Patching

Figure 1:
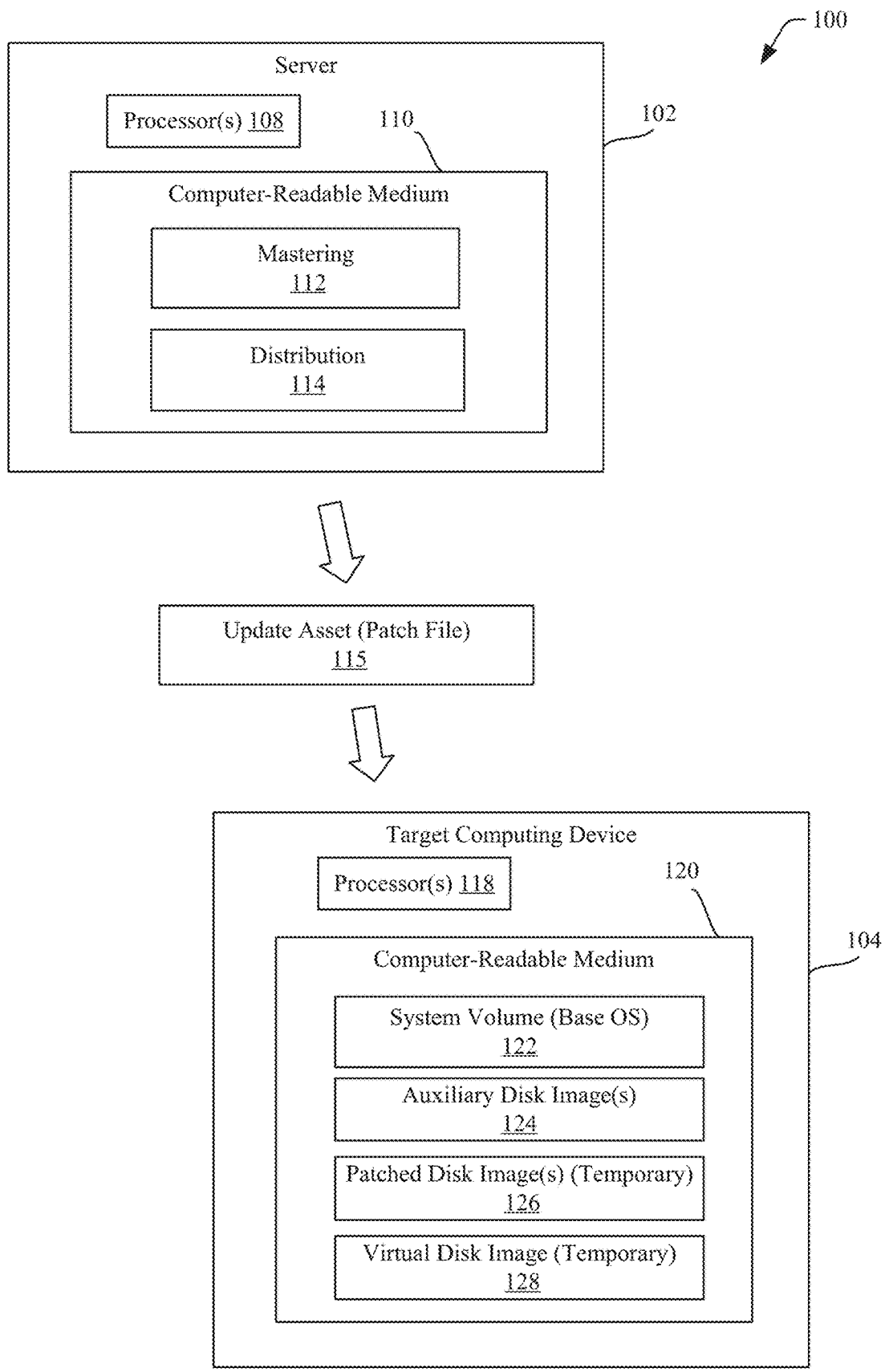
FIG. 1 illustrates an exemplary system for differential patching of compressed disk images according to certain aspects of the present disclosure.
Figure 2:
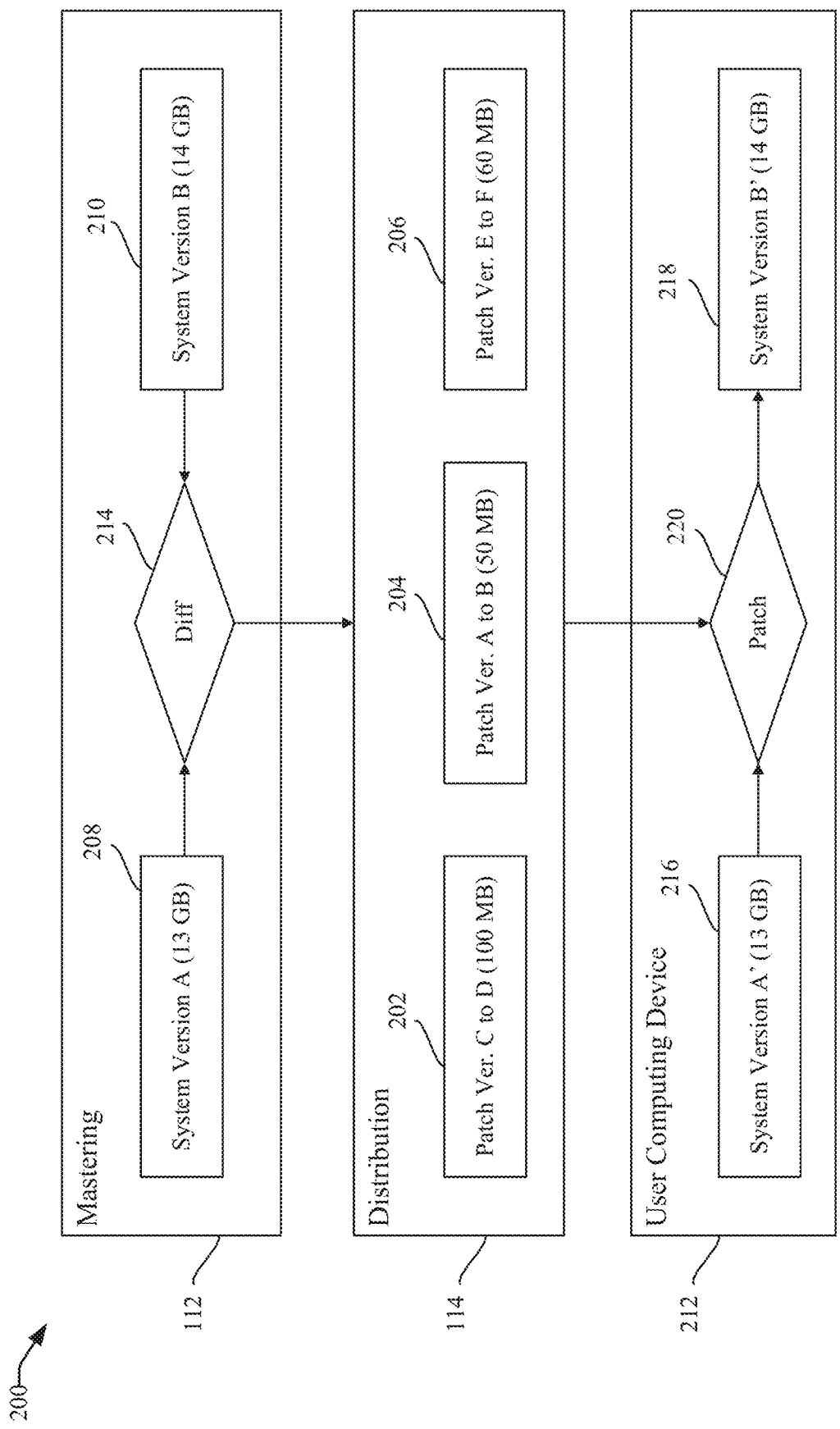
FIG. 2 is an exemplary block diagram showing a file distribution architecture for differential patching of compressed disk images according to certain aspects of the present disclosure.

In exemplary embodiments described below, a system and a file architecture for differential patching of compressed disk images according to certain aspects of the present disclosure are shown. FIG. 1 and its description provide an overview of the system. FIG. 2 and its description provide an explanation of an architecture for mastering and distributing patch files (update assets).

A. System Overview

The system described below determines the difference between two versions of a software program to create a patch file. Various patch files are created for different software programs including operating systems, and for different target computing devices. A distribution server manages the creation and distribution of the patch files as appropriate.

FIG. 1 depicts a block diagram of a system 100 for mastering and distributing patches files according to certain embodiments. System 100 includes server 102 and a target computing device 104. Server 102 includes one or more processors 108 and a computer-readable medium 110. The server 102 may include adapters, routers, etc., for accessing network-attached data stores, a communications network, or both. Computer-readable medium 110 may include non-transitory memories or other non-transitory media, used to store computer program code instructions for a mastering module 112 for creating differential patch files for various computer programs on various target computing devices. Some patch files in this example are intended for use on target computing device 104 to patch its code. Computer-readable medium 110 in this example also stores computer program code instructions for distribution module 114 to provide distribution of patch files for the various computing devices, including target computing device 104.

Server 102 can operate in any environment where a software may be mastered and distributed. The server may be physical or virtual and may include other functions, including cryptographic functions such as code signing and verification. As another example, the server may include a compiler used to generate copies of a machine-code program to transfer to user devices, either as a complete program or as a portion of the program within a patch file. The server may include or be a portion of an "app store" from which users acquire applications. Such an app store may also distribute copies of an operating system or operating system updates.

Target computing device 104 of system 100 includes one or more processors 118 and a computer-readable medium 120. Computer-readable medium 120 may include non-transitory memories or other non-transitory media, used to store computer program code instructions for executing a base operating system (OS) from system volume 122, and for storing one or more auxiliary disk images 124, which include certain code that is aligned with the base operating system of target computing device 104. The auxiliary disk image(s) 124 may include code that runs whenever the operating system is running, as well as applications that use that code. Such code may be updated more frequently than, for example, base OS code installed on system volume 122. More details of exemplary computing devices are described below with respect to FIG. 8.

Code is aligned with the base OS when the code is subject to the same integrity protections that protect the base OS. For example, the code may have a cryptographic relationship with the base OS. The code maintained in these disk images can include any code that is coupled more closely to the operating system than most applications. This code can include operating system code, application code, or both. By running such code from an auxiliary disk image, the code can in some instances be patched and then executed as patched without requiring a reboot of the target computing device. Since a reboot is not required, users are more likely to obtain and apply patches with less delay, which can be important for certain kinds of patches, such as those that provide information security updates.

In this example, an update asset 115 (patch or patch file) is distributed to target computing device 104, and is applied to produce a patched disk image 126. A virtual disk image 128 is used in processing update asset 115 to patch an auxiliary disk image 124 and produce one or more patched disk images 126. Virtual disk image 128 may be temporary and may be deleted from computer-readable medium 120 once the patching process is complete. Any or all disk images may be compressed.

Virtual disk image 128 is used for virtually restructuring and decompressing portions of a compressed, auxiliary disk image 124 in order to improve computational performance of the read and write actions necessary for applying the patch to the contents of the disk image. The base OS in this example will continue to execute during the patching process. Once the patching process is complete, aligned code is executed from a patched disk image 126. However, patched disk image 126 at some point in time may replace an auxiliary disk image 124 and become a new auxiliary disk image. Thus, while the code for the patched disk image may remain, there may at some point no longer be a disk image that the file system of computing device 104 references as a "patched disk image."

Code within an auxiliary disk image 124 and a patched disk image 126 is aligned with the base OS because the code is subject to the same integrity protections that protect the base OS. For example, the code may have a cryptographic relationship with the base OS. The code maintained in these disk images can include operating system code, application code, or both. The operating system code and/or the application code in the auxiliary disk image(s) may be subject to more frequent or more important updates than the base operating system code. Examples include code for a Web browser and code for operating system functions related to Internet access, which may be subject to more frequent security updates in order to protect target computing device 104 from hacking or malicious code that may be received via a local network connection or the Internet. The disk images may also include operating system extensions, linked libraries, and/or API kits, as examples.

Server 102 can optionally transmit update asset 115 to the target computing device 104 through one or more intermediary devices. The update asset may reside independently on the intermediary device until requested by or for the target computing device, or until distribution to the target computing device is triggered programmatically. For example, patch files can be distributed through a distribution server, a content data network server, or an application store server. The target computing device can download files including the update asset, or such files can be pushed to the target computing device.

Server 102 can also generate hashes for creating validation information for the input and output disk images. For example, a two-layer hash can be generated for a portion of a disk image. The two-layer hash can include a cryptographic hash (also referred to herein as a fingerprint) configured for identifying matching portions between an input file (a file or image as created by the distribution server) and an output file (a file or image used on the target computing device to apply the patch). The two-layer hash can also include a non-cryptographic hash (e.g., a cycle redundancy check) to be used as a fast identification check with a fallback to the cryptographic hash in case of a collision. Fingerprinting can accommodate verification or diffing of disk images that include operating system cache files, which can be very large. An operating system cache file is used with some operating systems as a bridge between memory and the processor.

Fingerprints may be based on small prefixes of hashes taken at intervals of the patch files. If there is a collision between the output hash and another cryptographic hash (fingerprint) from the patch file, the non-cryptographic hashes from the two-level hash can be used to validate the patch file by comparing the non-cryptographic hashes to known non-cryptographic hashes. Collisions can occur because the fingerprints are very small prefixes of a longer hash, such as a SHA-256 hash. A fingerprint may only be from 5 to 20 bytes in length. It is possible for two segments to therefore have the same fingerprint (a "collision"). The non-cryptographic hashes, like the fingerprints, can be produced in linear time, and once the non-cryptographic hashes are captured and stored, the disk images do not need to be read again to validate the virtual disk image using the cryptographic hashes.

B. File Distribution Architecture

The process described below takes the difference between two versions of a software program to create a patch file and coordinate the distribution of the patch file. An individual patch file can be created for a specific software program and for specific target computing devices. As one example, a patch file may be created for an auxiliary disk image.

FIG. 2 depicts a file distribution architecture 200, including mastering module 112 for mastering differential patch files and distribution module 114 to provide distribution of patch files such as patch file 202, patch file 204, and patch file 206. Patches may be mastered with architecture 200 for various target computing devices with installed software of various versions. Thus, various patch files are created for distribution to various target computing devices.

FIG. 2 illustrates the mastering of patch 204, which patches operating system version A, 208, to produce operating system version B, 210. As illustrated in FIG. 2, patches have also been mastered to produce patch 202 for patching a software application or operating system from version C to version D, and to produce patch 206 for patching a software application or operating system from version E to version F. Patch files as described in the examples herein are smaller than the application or operation system files to be patched. Patch 204 is 50 MB in size, whereas the relevant operating system versions are 13 GB and 14 GB in size. Patches 202 and 206 are also relatively small, with sizes of 100 MB and 60 MB, respectively.

In the example of FIG. 2, patch 204 is distributed to target computing device 212, which is a user computing device such as a notebook or desktop computer, tablet computer, wearable, smartphone, or any other user computing device. Patch 204 is mastered by a differential build (diff) module 214 within mastering module 112. Diff module 214 compares system version A to system version B to identify differences between the two, and produces patch file 204 that, when applied to system version A, updates the packages, images, files, etc. that are included in the system software as necessary to produce system version B. Patch file 204 contains differential binary updates of the files changed between the two versions. Patch file 204 may then be distributed to computing device 212. The differential nature of this patching technique helps to render patch files that are relatively small in size.

Diff module 214 does not necessarily process every segment of code in system version A or system version B. The system can be configured with knowledge of what files have changed and the extent of the changes. The diff module therefore does not need to compare files that are known not to have changed between the two system versions. Similarly, files which are known to have been completely or largely completely rewritten, or which are new files in system version B, can be added or replaced without making use of differential patching.

In this example, patch file 204 is provided to computing device 212 as an update asset to update the installation of operating system version A (operating system version A') 216 on computing device 212 to an installation of operating system version B (operating system version B') 218. Server 102 is used to issue update assets for base operating system code. However, in this example, patch 204 provides an update to system version A' 216 by updating auxiliary disk image 124 to produce patched disk image 126. The file sizes on computing device 104 are the same or close to the file sizes for copies stored on the server 102. The code that is patched is aligned with the base OS, and may include extensions, linked libraries, or both. The patching is accomplished in this example by patching module 220, which includes computer program instructions to apply patch file 204 using a virtual disk image 128.

II. Differential Patching

Figure 3:
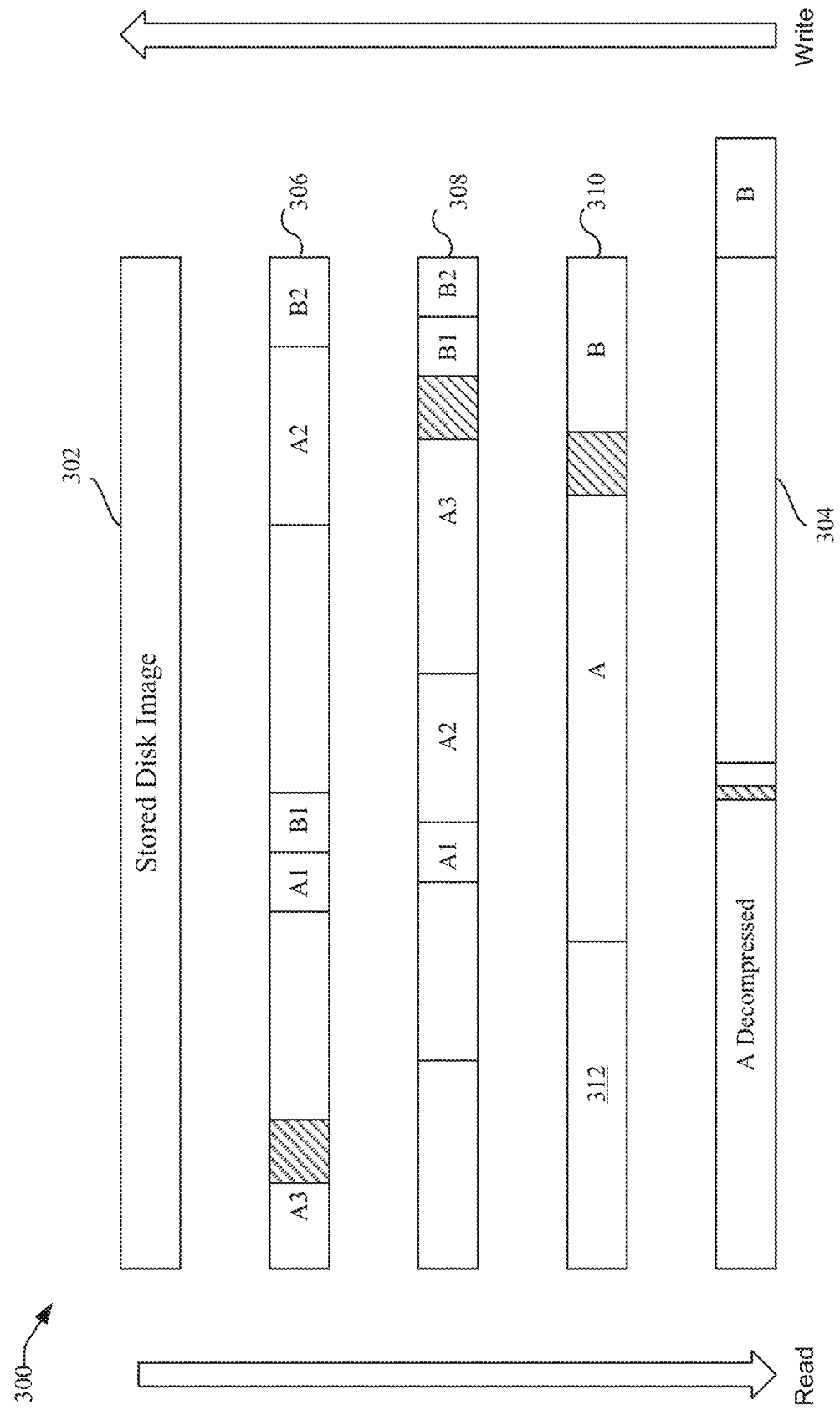
FIG. 3 is an exemplary block diagram showing read and write operations for virtual restructuring to patch a compressed disk image according to certain aspects of the present disclosure.
Figure 4:
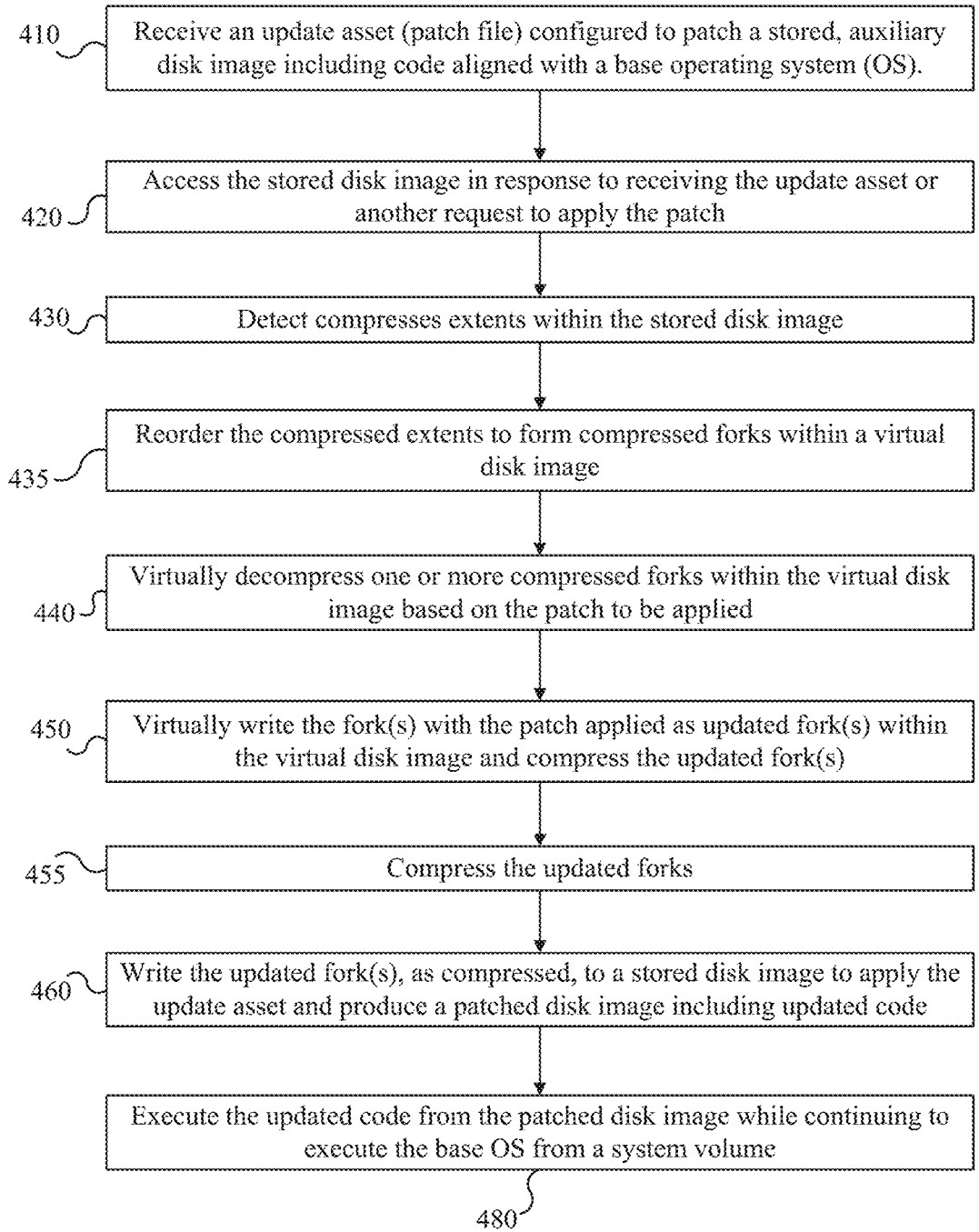
FIG. 4 illustrates an exemplary flowchart of a process for differential patching of compressed disk images according to certain aspects of the present disclosure.

In exemplary embodiments described below, the optional use of virtual restructuring for differential patching is described. FIG. 3 illustrates disk image views corresponding to various states of a virtual restructuring process. The process illustrated in FIG. 4 is an example of virtual restructuring being used to patch an auxiliary disk image that can be used to provide patches to certain operating system code or other code that is closely coupled to the operation system in order to allow a patch to be applied to such code without rebooting the computing device.

A. Virtual Restructuring

Virtual restructuring can be optionally used to improve computational performance for applying a software patch. When the server provides a patch file that includes a disk image with compressed content, virtual restructuring can be used on the target computing device. Virtual restructuring uses a virtual disk image in memory to reorder compressed extents to form compressed forks. Selected compressed forks can decompressed to apply the patch and patched code can be written back out to the compressed disk image from the virtual disk image. Virtual restructuring can also be used on the server in implementing the diff process that creates a patch file by creating a diffing virtual disk image. The use of the term "virtual disk image" herein generally refers to the patching virtual disk image used for patching a target computing device. A virtual disk image used for the patch creation process on a server is generally referred to as a diffing disk image.

FIG. 3 is an exemplary block diagram of disk images 300, each displaying a different state of virtual restructuring. The read operation is indicated by the vertical arrow on the left and the write operation is indicated by the vertical arrow on the right.

The read/write operations begin with a stored disk image 302, proceed to patched, virtual disk image 304, and end with the write operation back to stored disk image 302. The example of FIG. 3 is for in-place patching, wherein stored disk image 302 is overwritten to be patched. An updated fork may only need to be reconstructed and written back to storage to be content identical, without a constraint of being bit identical in regard to the compressed bitstream. In-place patching involves operating on the original disk image in place. However, it can be desirable to write to a separate patched disk image.

Once stored disk image 302 is accessed, compressed extents as shown in disk image 306 are detected. Disk image 306 includes compressed extents A1, A2, A3, B1, and B2. The file system provides an API to detect the forks and their extents.

The extents are reordered in order to form continuous forks within the virtual disk image. Disk image 308 is a virtual disk image in which the compressed extents have been reordered. Disk image 310 illustrates how the compressed extents now form continuous, compressed forks A, B, and C.

Disk image 304 is a virtual disk image in which fork A has been decompressed because fork A is the only fork with code that is to be patched, as indicated by the cross-hatched area. An uncompressed fork includes uncompressed extents. The process reformulates disk image patching by virtually restructuring the disk image and passing the final virtual views through the differential patching process, significantly reducing memory usage during processing. The differential patching can be accomplished sequentially, further improving performance.

Fork A is rewritten with patched code in the section indicated by cross-hatching using sequential differential patching. The updated fork is then written back to the stored disk image 302 as indicated by the write arrow. While writing the output disk image during patching, some compressed files may need to be recompressed on the fly. To accomplish this on-the-fly recompression, the extents can be further divided into chunks for processing. Since compression algorithms on the target computing device may be different from those that produced a patch, a recompressed chunk can exceed its compressed size budget. This excessive size of a chunk can be compensated for by appropriate sizing of other chunks or extents of the same fork.

The white space in FIG. 3, for example, white space 312 represents portions of the code that are known to be unchanged and are therefore not decompressed, recompressed, or rewritten to the stored disk image. Further, data written back to the stored disk image does not need to be bit-identical to the data that was in the virtual disk image, but only content identical relative to the corresponding data in the virtual disk image. These characteristics provides more flexibility to target various computing devices with different configurations and/or operating systems.

A virtual write can translate to one or more actual writes to the output disk image. If so, these writes should not overwrite input data, which may be referenced throughout the patching process. The computing device can keep track of the needed input segments and retain them in memory until they have been referenced. The use of the virtual disk image is not tied the actual content of a disk image that is being patched because only a small decompression cache has to be kept in memory for processing. It can also improve the speed of patching when storage is limited since the computing device can work with the entire, large disk image as opposed to only the portions that will fit in a limited amount of available storage or memory.

B. Process for Differential Patching using Virtual Restructuring

Operations described below use a virtual disk image to improve computational performance for applying a software patch. In this example, compressed forks are decompressed to apply the patch and patched code is written back out to the compressed disk image from the virtual disk image to improve speed and storage efficiency for the target computing device (e.g., target computing device 104) in applying a patch.

A process for using virtual restructuring to provide differential patching of an auxiliary disk image is discussed below with respect to FIG. 4, which is a flowchart of an example process 400 associated with such a technique. In some implementations, one or more process blocks of FIG. 4 may be performed by a computing device such as computing device 800 discussed below with respect to FIG. 8, using the processing unit or processor.

At 410, the computing device receives an update asset (patch file) such as update asset 115 or patch file 204. This update asset is configured to patch a stored disk image. In this example, the disk image is auxiliary disk image 124, which includes code aligned with the base operating system.

At 420, the computing device accesses the stored disk image, for example, stored disk image 302. The computing device 420 may access the stored disk image in response to receiving the update asset or in response to an internal or external request to apply the patch. In some examples, the receipt of the update asset can trigger the update automatically. In other examples, some other action, for example, user input or a set time of day being reached, may trigger the update. In some examples, a user may request the update by responding to a prompt or making a selection from a user interface, rather than waiting for the update asset to be provided. Once the update is transferred to the target computing device, an additional action may be necessary to initiate the patching process.

At 430, the computing device detects compressed extents within the stored disk image.

At 435, the computing device reorders the compressed extents to form compressed forks within a virtual disk image. Disk image 306 shows the compressed extents, and disk image 308 illustrates the compressed extents as reordered. Disk image 310 shows an example of the compressed forks formed from the compressed extents of disk image 308. Working with a virtual image is significantly faster than working with an actual image on disk would be for reordering compressed extents into compressed forks. Reordering the compressed extents to form complete forks for the entire virtual image provides for quickly locating forks that need to be decompressed to apply the patch.

At 440, the computing device virtually decompresses the compressed forks within the virtual disk image. In this example, the computing device decompresses one or more forks based on the patch's content, meaning that the computing device decompresses forks for code that is to be patched. The computing device can locate the forks quickly and efficiently because all of the forks have been virtually reassembled, even those that do not need to be decompressed to apply the patch.

At 450, the computing device applied the patch by replacing, in memory, each fork that is to be patched with a new version of the fork from the update asset. The computing device then virtually writes the new forks (forks with the patch applied) as updated forks within the virtual disk image.

At 455, the computing device compresses the updated forks within the virtual disk image. Each compressed updated fork is configured to replace a compressed fork without the update. In the example described below with respect to FIGS. 5 and 6, the compressed, updated forks can be used to write from the virtual disk image to the patched disk image 536.

At 460, the computing device writes the updated forks, as compressed, to produce an updated disk image. The updated disk image may be produced by overwriting the original disk image, or by creating a new disk image. The patching process uses knowledge of what files have changed and the extent of the changes as discussed above with respect to diff module 214. The application of the patch by the computing device can ignore files or portions within the code that are known to have no changes.

In one example, the stored disk image is the auxiliary disk image 124 and the updated disk image is the patched disk image 126, both of which include code aligned with the base operating system. However, a virtual disk image as described herein can be used to patch any disk image At 480, the computing device optionally executes the updated code from the patched disk image while continuing to execute the base operating system, for example, from system volume 122, as described in further detail below with respect to FIGS. 5 and 6. If the base operating system continues to execute, the computing device does not require a reboot or restart to complete the update, although a restart of one or more applications for which code was stored in the auxiliary disk image may be needed.

III. Patching Code for an Executing Operating System

In exemplary embodiments described below, an example process and an example file architecture for patching an auxiliary disk image including code aligned with a base operating system are shown. The patching can be accomplished while the base operating system is executing. The auxiliary disk image therefore provides for patching code that is part of the operating system or that runs an application that is closely tied to the operating system, and for executing the patched code without rebooting the computing device.

Figure 5:
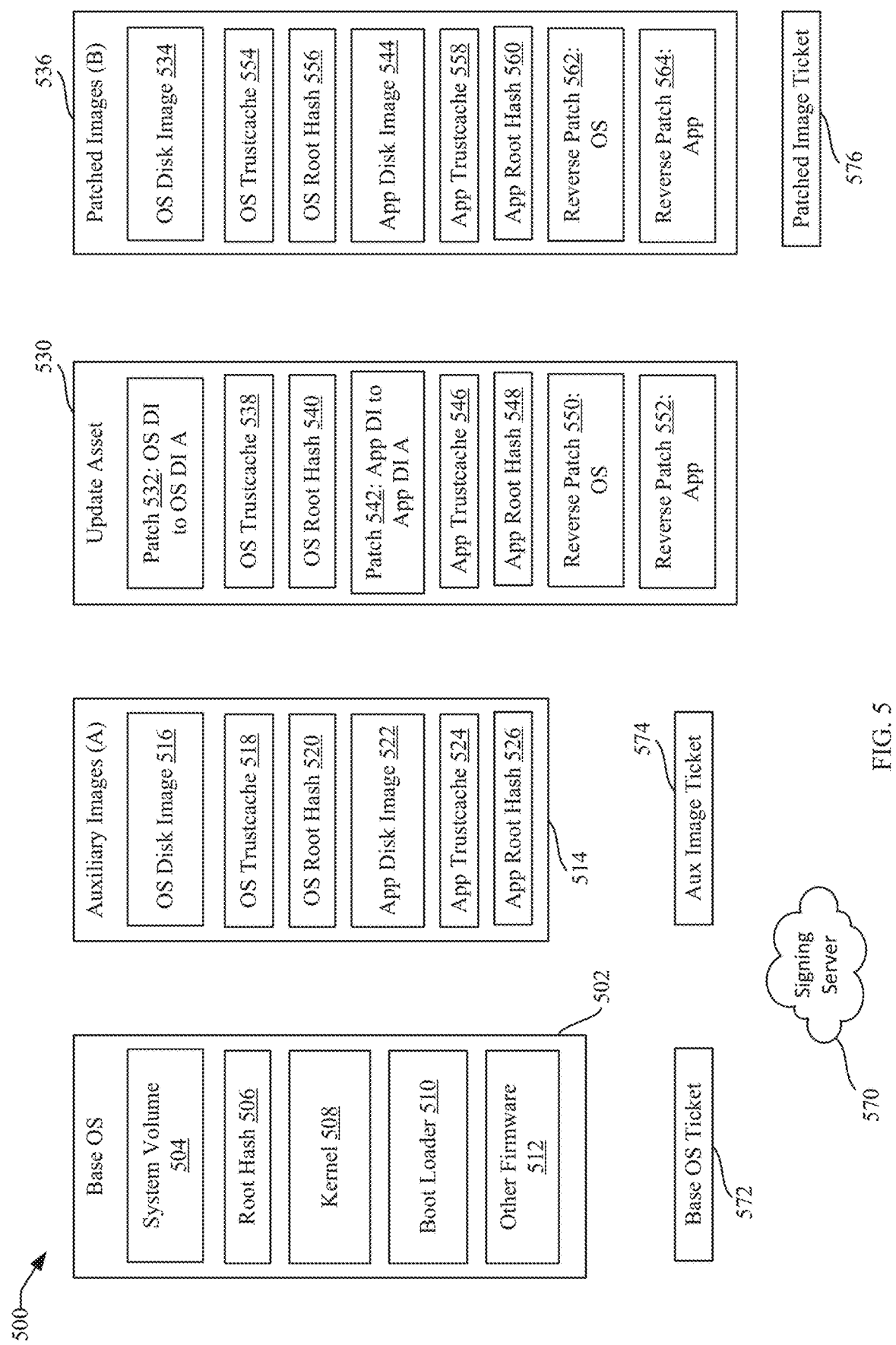
FIG. 5 is an exemplary block diagram showing a file architecture used to apply an update asset to patch code aligned with a base operating system and provide for reverse patching according to certain aspects of the present disclosure.
Figure 6:
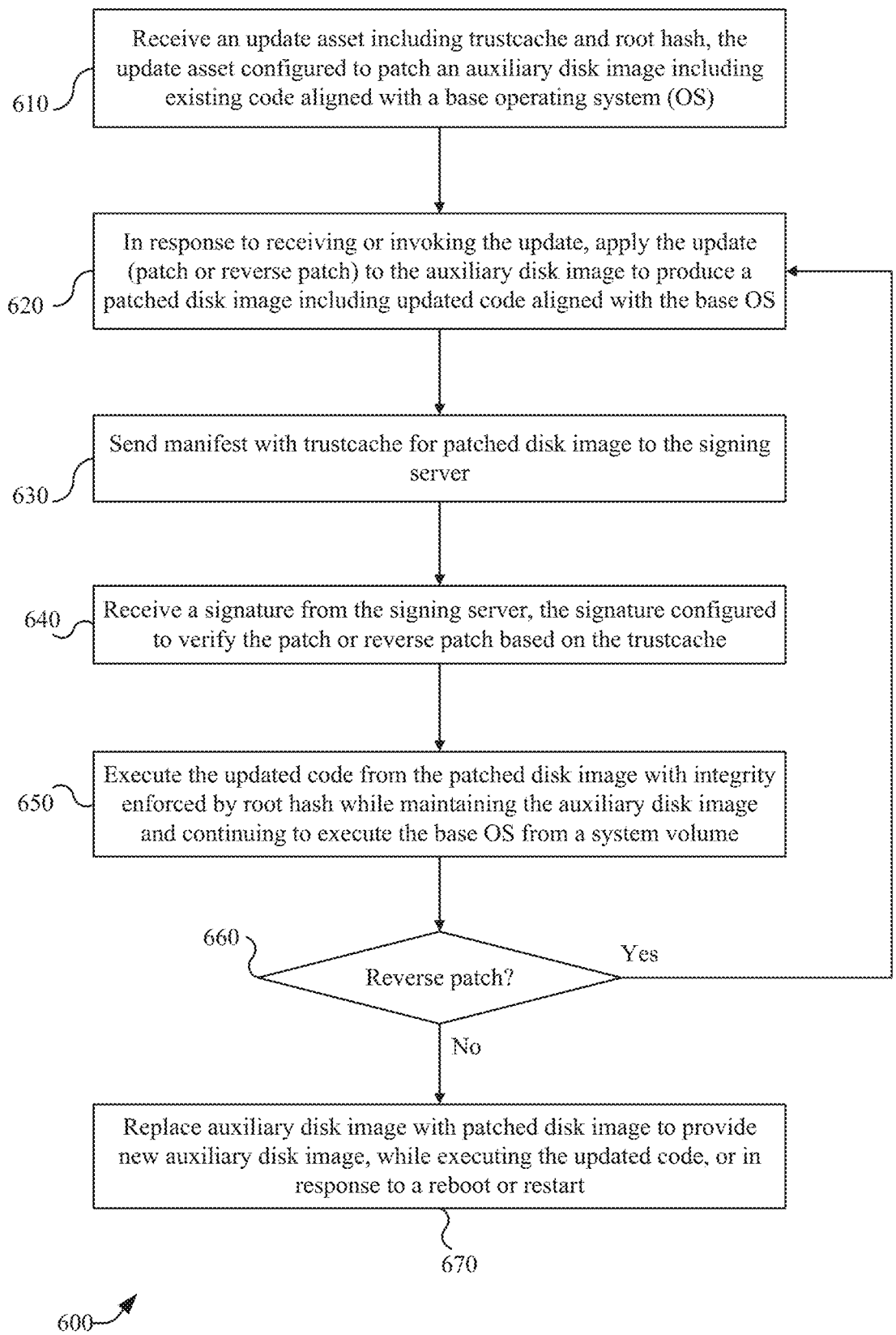
FIG. 6 illustrates an exemplary flowchart of a process for patching compressed, auxiliary disk images according to certain aspects of the present disclosure.

Additionally, in some examples, the patched code includes a reverse patch to revert to the previous version of the auxiliary disk image, again, without rebooting the computing device. FIG. 5 and its description explain the file architecture. FIG. 6 and its description explain the process.

A. File Architecture for Applying a Patch with Reverse Patching Capability

The example file architecture discussed below includes the auxiliary disk images, along with a system volume and other file structures that provide for patching (and reverse patching) code that is part of the operating system or that runs an application that is closely tied to the operating system and executing the patched code without rebooting the computing device. The file architecture includes disk images that serve as containers for relevant code as well as root hashes and trustcaches to support the disk images.

FIG. 5 is an exemplary block diagram showing a file architecture 500 used to apply an update asset to patch code aligned with a base operating system and provide for reverse patching. The file architecture 500 includes the base operating system, the auxiliary disk images, the update asset, and the patched disk image.

For purposes of the example illustrated in FIG. 5, it can be assumed that the operating system is being patched from version A to a new version referred to as version B. It can also be assumed for purposes of this example that the auxiliary image and the aligned code therein includes operating system code, such as operating system extensions or operating system libraries, and application code, which corresponds to an application that is tightly coupled with operating system functions. An example is the libraries and API code that provide web site rendering software for the operating system, with a Web browser as the application.

The file structure of FIG. 5 includes base operating system 502. Base operating system 502 includes system volume 504, root hash 506, operating system kernel 508, bootloader 510, and other firmware 512. Other firmware 512 may include, as examples, firmware for an electronic firmware interface to the computing device, or recovery firmware to allow booting the computing device if the base OS should become corrupted or portions are inadvertently deleted. The system volume can be protected by a Merkle tree that cryptographically verifies its contents at runtime for every read in order to protect the integrity of the system.

Continuing with FIG. 5, auxiliary disk images 514 include an operating system disk image 516 for the aligned operating system code, a trustcache 518 for that code, and a root hash 520 for the aligned operating system code. Auxiliary disk images 514 also include an application disk image 522 for the web browser or other application that is tightly coupled to the base operating system, an application trustcache 524, and an application root hash 526. The auxiliary disk images in these examples act as another part of the operating system that can be updated out of band, relative to the parts of the operating system in system volume 504 and the operating system kernel 508.

A disk image in the context of FIG. 5 is a cryptographic container for the relevant code. The container is cryptographically sealed, for example, using a Merkle tree, and the integrity of reads from, and writes to, the container are protected by the hash of the root node (also described as a "root hash"). The root node can then go on to contain hashes or digests for all of its children (as in a Merkle tree).

Update asset 530 has a structure similar to that of the auxiliary images except with patches rather than disk images in place for the OS aligned code and application(s). Update asset 530 includes patch 532 which, when applied, patches operating system disk image (DI) 516 to obtain operating system disk image 534 in patched disk image 536. Update asset 530 includes operating system trustcache 538 and operating system root hash 540. Update asset 530 in this example also includes patch 542 for patching application disk image 522 to obtain application disk image 544 in patched disk image 536. Update asset 530 also includes application trustcache 546 and application root hash 548.

Update asset 530 also includes reverse patch 550 for the operating system disk image and reverse patch 552 for the application disk image. These reverse patches can be created as part of the mastering process of server 102. Server 102 can use diff module 214 to produce a reverse patch to move from system version B to system version A, reversing a patch that has been applied to move from system version A to system version B.

Patched disk image 536 includes operating system trustcache 554 and operating system root hash 556. The patched disk image also includes application trustcache 558 and application root hash 560. The reverse patches are copied to patched disk image 536 as reverse patch 562 for the operating system disk image, and reverse patch 564 for the application disk image.

Also shown in file architecture 500 is signing server 570, which produces a signature ticket. The signing server takes as input a set of hashes of boot objects (in this example, the root hash and the trustcache) along with device identity information and other associated metadata. For example, signing server 570 produces a base operating system ticket 572, an auxiliary disk image ticket 574, and a patched disk image ticket 576. Each signature ticket is a cryptographically signed manifest that includes a description of the code that should be included in the respective disk image. The manifest in this context includes a measurement of each of the boot objects (root hash and trustcache). The manifest has a hash of the trustcache and the trustcache includes hashes of executable code within the disk image. The description should match the description in the stored trustcache for the disk image. If the two do not match, the code from the disk image will not be executed.

B. Process for Patching an Auxiliary Disk

FIG. 6 illustrates an exemplary flowchart for a process 600 of patching a compressed, auxiliary disk image according to certain aspects of the present disclosure. In some implementations, one or more process blocks of FIG. 6 may be performed by a system such as system 100 of FIG. 1, or a computing device such as computing device 800 discussed below with respect to FIG. 8, using the respective processing unit or processor.

At 610, the computing device receives an update asset. The update asset can include a trustcache and a root hash, for example, trustcaches 538 or 546 (or both) and root hashes 540 or 548 (or both). The update asset is configured to patch an auxiliary disk image such as auxiliary disk image 514 including existing code aligned with a base operating system. As an example, the auxiliary disk image can include one or both of a portion of the operating system and one or more applications or portions of applications. The portion of the operating system can reside in its own cryptographic container in the auxiliary disk images 514, such as disk image 516, and the code for the application(s) can reside in a separate cryptographic container such as disk image 522.

The operating system code in the auxiliary disk image can include, for example, any library code that the operating system may move to a shared library cache. The application code can include, for example, applications that use the library code. As a further example, the library code may include libraries connected with Internet access, and the application code may include code for a Web browser that makes use of the libraries.

At 620, the update is applied to the auxiliary disk image to produce a patched disk image such as patched disk image 536 including updated code aligned with the base operating system. The update may be applied automatically in response to receiving the update asset, or the update may be invoked by a user of the computing device entering input, or through messaging from another entity, such as distribution server 102.

At 630, the computing device can optionally send a copy of the trustcache for one or more of the patched disk images to the signing server, so that the signing server can return a signature ticket including a signed manifest. The patched disk image can include a reverse patch such as reverse patch 564 with copies of previous boot objects necessary to run the previous version of the aligned code. The reverse patch can be used to revert from the patched disk image to the auxiliary disk image, which includes the previous version of the aligned operating system code and the previous version of the application code. Reverse patching can be carried out until and unless the auxiliary disk image is replaced with the patched disk image to serve as a new auxiliary disk image going forward in time.

At 640, the computing device can receive a signature, also referred to as a ticket or signature ticket, from a signing server. This signing is configured to validate a manifest including a hash of the root hash to cover the contents of the disk image and as hash of the trustcache, which includes hashes of the executable code inside the disk image. The signing server 570 validates the manifest as known at the time the code in the disk image was mastered.

At 650, the updated code from the patched disk image is executed. In some examples, the existing auxiliary disk image can be used to execute unpatched code until a reboot. Integrity can be enforced by the root hash. The base OS can continue to execute from the system volume 504.

The signing server can be preconfigured to examine the manifest of each disk image in the disk images because measurements of the boot objects were nominated, meaning that copies of the measurements were provided to the signing system at the time the various disk images were mastered for distribution. If a deployed computing device attempts to apply a patch to the auxiliary disk image (or any part of the operating system) in such a case, and that patch was not nominated to the signing server, the signing server will not issue a ticket, and the patch will not be applied.

If the reverse patch is invoked at 660, processing returns to 620, where patching, signing, and executing of the updated code takes place as just discussed, but the reverse patch is the patch.

Otherwise, at 670, the auxiliary disk image is replaced with the patched disk image to provide a new auxiliary disk image to return the computing device to its file structure with a system volume and auxiliary disk image. This update to the auxiliary disk image can take place at any time while executing the updated code from memory, or in response to a reboot of the computing device or a restart of the operating system. If the auxiliary disk image is updated just in response the updated code is being executed from memory, the computing device can be configured to carry out the replacement of the code when execution from memory begins or after some fixed or configurable period of time.

IV. Virtual Restructuring Using Hashes

Figure 7:
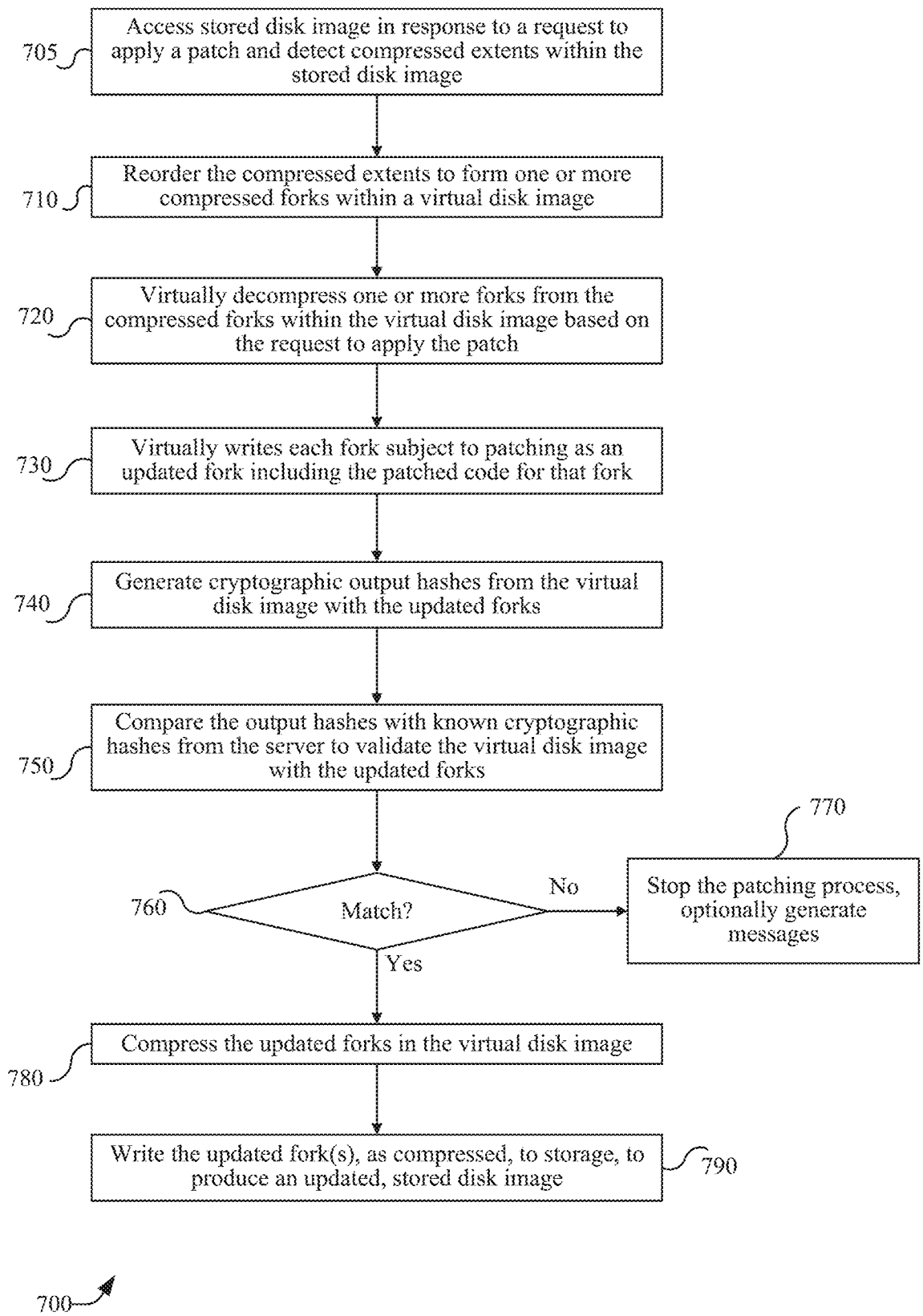
FIG. 7 illustrates an exemplary flowchart of a process for virtual restructuring to patch a compressed disk image according to certain aspects of the present disclosure.

FIG. 7 illustrates further details of the virtual restructuring process as exemplified by 430 through 460 of FIG. 4 and the virtual disk images of FIG. 3. The optional use of hashes for validation of the virtual disk image ensures the accuracy of patched code that is written back to storage in the form of compressed, updated forks. The virtual restructuring process as described below with respect to FIG. 7 may optionally be used in patching auxiliary disk images used to provide for updating certain code without rebooting, but virtual restructuring can also be used to patch other types of disk images used for other purposes.

FIG. 7 illustrates an exemplary flowchart for virtual restructuring to patch a compressed disk image according to certain aspects of the present disclosure. In some implementations, one or more process blocks of FIG. 7 may be performed by a computing device such as computing device 800 discussed below with respect to FIG. 8, using the processing unit or processor.

At 705, the computing device accesses a stored disk image in response to a request to apply a patch and detects compressed extents within the stored disk image. The request to apply the patch, as examples, may take the form of receiving the patch from a distribution system or server such as server 102, receiving an explicit command to apply the patch from a distribution system, or receiving input through a user interface directing the patching.

At 710, the computing device reorders compressed extents to form one or more compressed forks within a virtual disk image such as virtual disk image 128 in order to form complete forks for the entire virtual image. For example, disk image 306 shows the compressed extents, and disk image 308 illustrates the compressed extents as reordered. Working with a virtual image is significantly faster than working with an actual image on disk would be for reordering compressed extents into compressed forks.

At 720, the computing device virtually decompresses one or more of these forks within the virtual disk image based on the request to apply the patch. For example, the decompression may be based on the portions of the code within the virtual disk image that are to be patched. Decompression can be used to obtain information about similarities between the code that is to be patched and the code in the patch in order to identify where the patch is to be applied. Any suitable compression algorithm can be used for the disk image and hence the compressed forks, as long as it is supported by the file system. Examples include ZLIB, LZVN, LZFSE, etc.

At 730, the computing device virtually writes forks of code that have been subject to patching. Each fork that has been patched is written so as to replace the previous, unpatched fork. Each such fork can be written as an updated fork including the patched code for that fork. For example, referring to FIG. 3, fork A is the only fork to be patched. Thus, the patched version of fork A replaces the previous version of fork A.

At 740, the computing device can generate one or more output hashes from the virtual disk image with the updated forks. The output hashes, in this example, can be cryptographic hashes from the virtual disk image. These cryptographic hashes may be independent of and different than the cryptographic hashes in the two-layer hashes used to create the patch prior to distribution. Output hashes, either independently or together, may only correspond to a small portion of the virtual disk image. Alternatively, an output hash of the entire disk image may be used to validate the virtual disk image. The cryptographic hashes can be distributed at regular intervals and do not necessarily coincide with particular forks. They can be created in linear time and once the hashes are captured and stored, the disk images do not need to be read again to validate a disk image.

At 750, the computing device compares the output hashes with known cryptographic hashes to validate the virtual disk image with the updated forks. The known hashes can be provided by the distribution server for the patch, for example, distribution server 102. For example, the known hashes can be created and included in the patched file prior to distributing the patch in the same manner as the target computing device will generate output hashes for the virtual disk image. In some examples, the hashes are taken at regular intervals within the data stream of an entire disk image.

At 760, if the hashes do not match, the process may stop at 770. Optionally messaging can be provided to the server or to a user interface of the target computing device. If the hatches match, the target computing device can proceed to 780.

At 780, the computing device compresses the updated forks in the virtual disk image in response to validation using either fingerprints or non-cryptographic hashes.

At 790, the computing device writes the updated fork, as compressed, to storage in order to produce an updated, stored disk image. The updated disk image may be produced by overwriting the original stored disk image, or by creating a new stored disk image.

V. Exemplary Computing Devices

Figure 8:
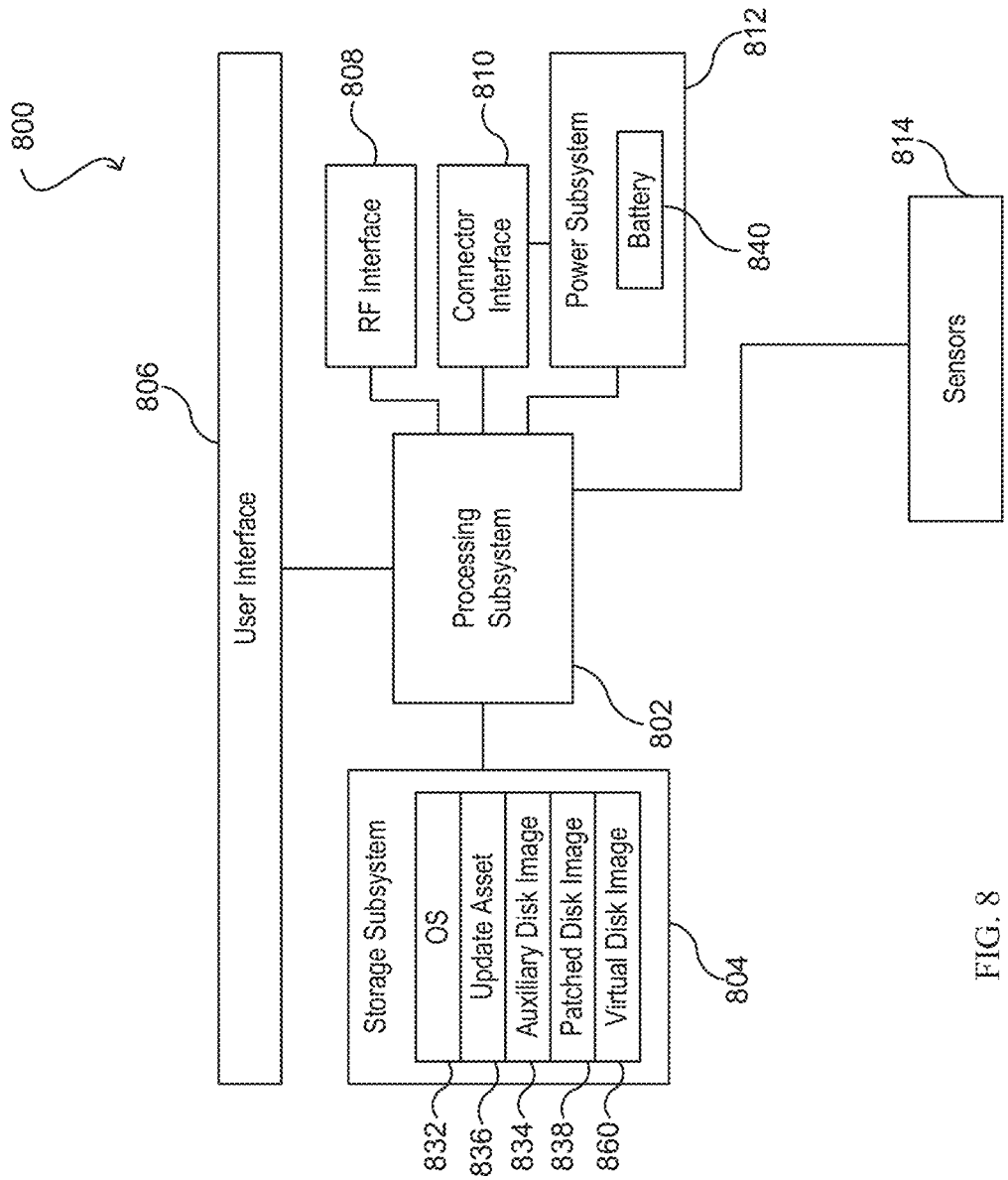
FIG. 8 is a block diagram of an exemplary computing device according to certain aspects of the present disclosure.

FIG. 8 is a block diagram of a computing device 800 according to certain embodiments. The computing device 800 can serve as a target computing device as previously described. However, computing device 800 may be implemented as any wearable or implantable device, a mobile device, or server, or a desktop/notebook computer system. A computing device like computing device 800 could also include mastering and distribution capability for patch files serving as a distribution server.

Computing device 800 can include processing subsystem 802, storage subsystem 804, user interface 806, RF interface 808, connector interface 810, power subsystem 812, and sensors 814. Computing device 800 can also include other components (not explicitly shown).

Storage subsystem 804 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 804 can store media items such as audio files, video files, image or artwork files; information about a user's contacts (names, addresses, phone numbers, etc.); information about a user's scheduled appointments and events; notes; and/or other types of information, examples of which are described below. In some embodiments, storage subsystem 804 can also store one or more application programs to be executed by processing subsystem 802 (e.g., video game programs, personal information management programs, media playback programs, interface programs associated with particular host devices and/or host device functionalities, etc.).

User interface 806 can include any combination of input and output devices. A user can operate input devices of user interface 806 to invoke the functionality of computing device 800 and can view, hear, and/or otherwise experience output from computing device 800 via output devices of user interface 806. In the case of an implanted medical device, the user interface may not be directly wired to the other components, may only provide output function, or may not exist at all. Otherwise, examples of output devices include a display, speakers and a haptic output generator.

Computing device 800 may also provide alerts to a user. An alert may be generated in response to: a change in status of the device (one example of which is power running low); receipt of information by the device (such as receiving a message); communications between the device and another mechanism/device (such as a second type of device informing the device that a message is waiting or communication is in progress); an operational state of an application (such as, as part of a game, or when a calendar appointment is imminent) or the operating system (such as when the device powers on or shuts down); and so on. The number and types of triggers for an alert are various and far-ranging.

An alert may be auditory, visual, haptic, or a combination thereof. A haptic actuator may be housed within the device and may move linearly to generate haptic output (although in alternative embodiments the haptic actuator may be rotary or any other type). A speaker may provide auditory components of an alert and the aforementioned display may provide visual alert components. In some embodiments a dedicated light, display, or other visual output component may be used as part of an alert.

Examples of input devices include a microphone, a touch sensor, or a camera. A microphone can include any device that converts sound waves into electronic signals. A touch sensor can include, e.g., a capacitive sensor array with the ability to localize contacts to a particular point or region on the surface of the sensor and in some instances, the ability to distinguish multiple simultaneous contacts. In some embodiments, a touch sensor can be overlaid over a display to provide a touchscreen interface, and processing subsystem 802 can translate touch events (including taps and/or other gestures made with one or more contacts) into specific user inputs depending on what is currently displayed on a display. In some embodiments, a touch sensor can also determine a location of a touch on a screen. A touch sensor may be incorporated into or on the display stack in order to determine a location of a touch. The touch sensor may be self-capacitive in certain embodiments, mutual-capacitive in others, or a combination thereof.

A display stack may include a cover element, such as a cover glass, overlying a display. The cover glass need not necessarily be formed from glass, although that is an option; it may be formed from sapphire, zirconia, alumina, chemically strengthened glass, hardened plastic and so on. Likewise, the display may be a liquid crystal display, an organic light-emitting diode display, or any other suitable display technology. Among other elements, the display stack may include a backlight in some embodiments. In some embodiments, user interface 806 can provide output to and/or receive input from an auxiliary device such as a headset.

Processing subsystem 802 can be implemented as any electronic device capable of processing, receiving, or transmitting data or instructions. Processing subsystem 802 can include one or more integrated circuits. For example, processing subsystem 802 may include one or more of: one or more single core or multi core microprocessors or microcontrollers, a central processing unit (CPU), an application-specific integrated circuit (ASIC), a digital signal processor (DSP), or additional or combinations of such devices. In operation, processing subsystem 802 can control the operation of computing device 800. In various embodiments, processing subsystem 802 can execute a variety of programs in response to program code and can maintain multiple concurrently executing programs or processes. At any given time, some or all of the program code to be executed can be resident in processing subsystem 802 and/or in storage media such as storage subsystem 804.

Through suitable programming, processing subsystem 802 can provide various functionality for computing device 800. For example, in some embodiments, processing subsystem 802 can execute a base OS 832 and various applications. In some embodiments, computing device 800 includes auxiliary disk image 834 and update asset 836, which updates the auxiliary disk image to provide a patched disk image 838 to be run until the device is restarted, in which case the patched disk image replaces the auxiliary disk image to become a new auxiliary disk image. During the patching process, a virtual disk image 860 is temporarily stored. If computing device 800 serves as a source computing device, storage subsystem 804 would additionally, or alternatively include computer program code for mastering and distribution of patch files.

RF (radio frequency) interface 808 can allow computing device 800 to communicate wirelessly with various host devices. RF interface 808 can include RF transceiver components such as an antenna and supporting circuitry to enable data communication over a wireless medium, e.g., using Wi Fi (IEEE 802.11 family standards), Bluetooth® (a family of standards promulgated by Bluetooth SIG, Inc.), or other protocols for wireless data communication. RF interface 808 can be implemented using a combination of hardware (e.g., driver circuits, antennas, modulators/demodulators, encoders/decoders, and other analog and/or digital signal processing circuits) and software components. In some embodiments, RF interface 808 can provide near field communication ("NFC") capability, e.g., implementing the ISO/IEC 18092 standards or the like; NFC can support wireless data exchange between devices over a very short range (e.g., 20 centimeters or less). Multiple different wireless communication protocols and associated hardware can be incorporated into RF interface 808.

Connector interface 810 can allow computing device 800 to communicate with various other devices via a wired communication path, e.g., using Universal Serial Bus (USB), universal asynchronous receiver/transmitter (UART), or other protocols for wired data communication. In some examples, an untrusted machine-code program may be received from a USB flash drive that through USB. In some examples, connector interface 810 can provide a power port, allowing computing device 800 to receive power, e.g., to charge an internal battery. For example, connector interface 810 can include a connector such as a mini-USB connector or a custom connector, as well as supporting circuitry. In some embodiments, the connector can be a custom connector that provides dedicated power and ground contacts, as well as digital data contacts that can be used to implement different communication technologies in parallel; for instance, two pins can be assigned as USB data pins (D+ and D) and two other pins can be assigned as serial transmit/receive pins (e.g., implementing a UART interface). The assignment of pins to particular communication technologies can be hardwired or negotiated while the connection is being established. In some embodiments, the connector can also provide connections for audio and/or video signals, which may be transmitted to or from a host device in analog and/or digital formats.

Sensors 814 can include various electronic, mechanical, electromechanical, optical, or other devices that provide information related to external conditions around computing device 800. Sensors 814 in some embodiments can provide digital signals to processing subsystem 802, e.g., on a streaming basis or in response to polling by processing subsystem 802 as desired. Any type and combination of sensors can be used; examples include an accelerometer, a magnetometer, a gyroscope sensor, and a GPS receiver.

In the case of a wearable computing device, some sensors can provide information about the location and/or motion of computing device 800. For example, an accelerometer can sense acceleration (relative to freefall) along one or more axes, e.g., using piezoelectric or other components in conjunction with associated electronics to produce a signal. A magnetometer can sense an ambient magnetic field (e.g., Earth's magnetic field) and generate a corresponding electrical signal, which can be interpreted as a compass direction. A gyroscope sensor can sense rotational motion in one or more directions, e.g., using one or more MEMS (micro electromechanical systems) gyroscopes and related control and sensing circuitry. A GPS receiver can determine location based on signals received from GPS satellites. Other sensors can also be included in addition to or instead of these examples.

In the case where computing device 800 is a medical device, sensors 814 may include biometric sensors to measure certain physiological characteristics of a user. The device may include a photoplesymogram sensor to determine a user's heart rate or blood oxygenation levels, for example. The device may also or instead include electrodes to measure the body impedance of a user, which may permit the device to estimate body fat percentages, the body's electrical activity, body impedance, and so on. In some embodiments, the device may also measure blood pressure, ultraviolet exposure, etc. Depending on the sensors incorporated into or associated with the computing device, a variety of user characteristics may be measured and/or estimated, thereby permitting different health information to be provided to a user. In some examples, the sensed biometric information may be used to generate alerts on computing device 800 or on other devices by using RF interface 808 or connector interface 810.

Power subsystem 812 can provide power and power management capabilities for computing device 800. For example, power subsystem 812 can include a battery 840 (e.g., a rechargeable battery) and associated circuitry to distribute power from battery 840 to other components of computing device 800 that require electrical power. In some embodiments, power subsystem 812 can also include circuitry operable to charge battery 840, e.g., when connector interface 810 is connected to a power source. In some embodiments, power subsystem 812 can include a "wireless" charger, such as an inductive charger, to charge battery 840 without relying on connector interface 810. An inductive charging base may transmit power to an inductive receiver within the device in order to charge a battery of the device. Further, by varying the inductive field between the device and base, data may be communicated between the two. As one simple non-limiting example, this may be used to wake the base from a low-power sleep state to an active charging state when the device is placed on the base. Other wireless charging systems also may be used (e.g., near field magnetic resonance and radio frequency). Alternatively, the device also may employ wired charging through electrodes. In some embodiments, power subsystem 812 can also include other power sources, such as a solar cell or AC power supply, in addition to or instead of battery 840.

In some embodiments, control functions of power subsystem 812 can be implemented using programmable or controllable circuits operating in response to control signals generated by processing subsystem 802 in response to program code executing thereon. It will be appreciated that computing device 800 is illustrative and that variations and modifications are possible.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

What is claimed is:

1. A method comprising performing, by a computing device:
   accessing a stored disk image in response to a request to apply a patch to the stored disk image;
   detecting compressed extents within the stored disk image;
   reordering the compressed extents to form one or more compressed forks within a virtual disk image;
   virtually decompressing at least one fork from the one or more compressed forks within the virtual disk image based on the request to apply the patch;
   virtually writing the at least one fork with the patch to the virtual disk image as an updated fork;
   compressing the updated fork; and writing the updated fork, as compressed, to storage to produce an updated, stored disk image.

2. The method of claim 1, further comprising:
generating an output hash from the virtual disk image with the updated fork; and
comparing the output hash with a known hash to validate the virtual disk image with the updated fork,
wherein compressing the updated fork is in response to validating the virtual disk image.

3. The method of claim 1, further comprising producing a two-layer hash including a cryptographic hash configured for identifying differences between an input file and an output file to produce the patch.

4. The method of claim 3, the cryptographic hash corresponds to a segment from a plurality of segments of a diffing disk image.

5. The method of claim 4, wherein the two-layer hash further comprises a non-cryptographic hash.

6. The method of claim 5, further comprising comparing the non-cryptographic hash to a known non-cryptographic hash to validate the diffing disk image in response to a collision between an output hash and another cryptographic hash.

7. The method of claim 1, wherein the stored disk image comprises an auxiliary disk image including code aligned with a base operating system of the computing device.

8. The method of claim 1, wherein compressing the updated fork further comprises:
dividing at least one uncompressed extent within the updated fork into a plurality of chunks; and
recompressing at least one of the plurality of chunks while sizing other chunks from the plurality of chunks or other uncompressed extents within the updated fork to compensate for a size of the at least one of the plurality of chunks.

9. The method of claim 1, wherein writing the updated fork, as compressed, further comprises writing the updated fork to be content identical without a constraint of being bit identical to the updated fork prior to being compressed.

10. A non-transitory computer-readable medium storing a plurality of instructions that, when executed by one or more processors of a computing device, causes the one the one or more processors to:
access a stored disk image in response to a request to apply a patch to the stored disk image;
detect compressed extents within the stored disk image;
reorder the compressed extents to form one or more compressed forks within a virtual disk image;
virtually decompress at least one fork from the one or more compressed forks within the virtual disk image based on the request to apply the patch;
virtually write the at least one fork with the patch to the virtual disk image as an updated fork;
compress the updated fork; and
write the updated fork, as compressed, to storage to produce an updated, stored disk image.

11. The non-transitory computer-readable medium of claim 10, the instructions further causing the one or more processors to:
generate an output hash from the virtual disk image with the updated fork; and
compare the output hash with a known hash to validate the virtual disk image with the updated fork,
wherein the one or more processors compress the updated fork in response to validating the virtual disk image.

12. The non-transitory computer-readable medium of claim 10, the instructions further causing the one or more processors to produce a two-layer hash including a non-cryptographic hash configured to validate a diffing disk image in response to a collision and a cryptographic hash configured to identify differences between an input file and an output file to produce the patch.

13. The non-transitory computer-readable medium of claim 10, the instructions further causing the one or more processors to:
divide at least one uncompressed extent within the updated fork into a plurality of chunks; and
recompress at least one of the plurality of chunks while sizing other chunks from the plurality of chunks or other uncompressed extents within the updated fork to compensate for a size of the at least one of the plurality of chunks.

14. The non-transitory computer-readable medium of claim 10, wherein the one or more processors write the updated fork, as compressed, to be content identical without a constraint of being bit identical to the updated fork prior to being compressed.

15. A computing device comprising:
one or more memories; and
one or more processors communicatively coupled to the one or more memories and configured to execute instructions stored in the one or more memories for performing operations of:
accessing a stored disk image in response to a request to apply a patch to the stored disk image;
detecting compressed extents within the stored disk image;
reordering the compressed extents to form one or more compressed forks within a virtual disk image;
virtually decompressing at least one fork from the one or more compressed forks within the virtual disk image based on the request to apply the patch;
virtually writing the at least one fork with the patch to the virtual disk image as an updated fork;
compressing the updated fork; and
writing the updated fork, as compressed, to storage to produce an updated, stored disk image.

16. The computing device of claim 15, the one or more processors further configured to execute instructions for performing operations of:
generating an output hash from the virtual disk image with the updated fork; and
comparing the output hash with a known hash to validate the virtual disk image with the updated fork,
wherein compressing the updated fork is in response to validating the virtual disk image.

17. The computing device of claim 15, the one or more processors further configured to execute instructions for performing an operation of producing a two-layer hash including a cryptographic hash corresponding to a segment from a plurality of segments of a diffing disk image, the cryptographic hash configured for identifying differences between an input file and an output file to produce the patch.

18. The computing device of claim 15, wherein the stored disk image comprises an auxiliary disk image including code aligned with a base operating system of the computing device.

19. The computing device of claim 15, the one or more processors further configured to execute instructions for performing operations of:
dividing at least one uncompressed extent within the updated fork into a plurality of chunks; and
recompressing at least one of the plurality of chunks while sizing other chunks from the plurality of chunks or other uncompressed extents within the updated fork to compensate for a size of the at least one of the plurality of chunks.

20. The computing device of claim 15, wherein writing the updated fork, as compressed, further comprises writing the updated fork to be content identical without a constraint of being bit identical to the updated fork prior to being compressed.

\* \* \* \* \*

UNITED STATES PATENT AND TRADEMARK OFFICE
CERTIFICATE OF CORRECTION

| | |
|---|---|
| PATENT NO. | : 11,914,983 B2 |
| APPLICATION NO. | : 17/898013 |
| DATED | : February 27, 2024 |
| INVENTOR(S) | : Christian T. Martelock, Ali Sazegari and Eric Bainville |

It is certified that error appears in the above-identified patent and that said Letters Patent is hereby corrected as shown below:

In the Claims

In Column 19 Line 42, delete "the one the one" and insert --the one--, therefore.

Signed and Sealed this
Fourth Day of June, 2024

Katherine Kelly Vidal
*Director of the United States Patent and Trademark Office*